United States Patent Office 3,301,886
Patented Jan. 31, 1967

3,301,886
PROCESS FOR PREPARING ARYL SULFONIC ACID ESTERS
Gershon Metzger, Elizabeth, N.J., assignor to Esso Research and Engineering Company, a corporation of Delaware
No Drawing. Filed Nov. 8, 1963, Ser. No. 322,519
11 Claims. (Cl. 260—456)

This invention relates to processes for preparing sulfonic acid esters. The inventive processes will find particular application in the preparation of aromatic sulfonic acid esters.

BACKGROUND

The utility of sulfonic acid esters is generally known in the art. For example, some are known to be useful as alkylating agents in the manufacture of dyes, as surface tension depressants, as corrosion inhibitors, as catalysts for curing urea/formaldhyde resins, as plasticizers for polyvinylchloride, as additives for quenching fluids, etc.

As indicated above, the inventive processes are applicable to the preparation of sulfonic acid esters in general (i.e. aliphatic sulfonic acid esters, as well as aromatic sulfonic acid esters). However, sulfonic acid esters (e.g., aliphatic sulfonic acid esters) other than aromatic sulfonic acid esters are generally easier to prepare than are the aromatic sulfonic acid esters. Since the latter are so much more difficult to prepare in good yields by conventional esterification techniques, the following description of the inventive processes and the prior art is made with particular reference to aromatic sulfonic acid esters. It is in this latter application (i.e. preparation of aromatic sulfonic esters) that the inventive processes offer the greatest advantage when contrasted with the less effective techniques currently employed.

Frequently, aromatic sulfonic esters of aliphatic alcohols have been prepared on a commercial scale by direct esterification techniques. Direct esterification techniques, however, do not produce aromatic sulfonic esters in good yields. Consequently, it has been proposed to produce aromatic sulfonic esters in good yields by reacting the corresponding aromatic sulfonyl chloride with the desired alcohol in the presence of potassium hydroxide. With the normal or straight chain aliphatic alcohols, this process has proven satisfactory and gives reasonably good results although the formation of the sulfonyl chloride is, at best, an inconvenient reaction. However, when such a technique is applied to branched chain alcohols (e.g., secondary or tertiary alcohols), the yields of the resulting aromatic sulfonic esters of these branched chain alcohols is very low, usually on the order of from 30 to 50%. More recently, Waldron and Franklin have proposed in U.S. No. 2,728,788, to produce aromatic sulfonic acid esters of branched chain alcohols (e.g., secondary and tertiary alcohols) by a still different process. According to their process, the corresponding aromatic sulfonyl chloride is reacted with a sodium alkoxide of the branched-chain alcohol in the presence of a diluent. By that process they obtain yields of from 70 to 85% of theoretical based on the amount of aromatic sulfonyl chloride employed.

DISCOVERY

It has now been discovered, and this discovery forms the basis of the present invention, that aromatic sulfonic acid esters can be prepared in even higher yields, without the inconvenience of first forming the sulfonyl chloride, by reacting metal salt of the corresponding aromatic sulfonic acid with an alkyl sulfate. Generally, and preferably, this reaction is conducted in the presence of a diluent (not always required, but often required and always preferred) and in the further presence of a base such as sodium bicarbonate ($NaHCO_3$). Ester yields which are essentially quantitative (based on the amount of metal sulfonate employed) are quite frequently obtained. The desired aromatic sulfonic acid ester may be isolated from the crude reaction mixture in any number of ways, e.g., by first filtering any unwanted insoluble salts from the crude reaction product and then evaporating the diluent and any excess alkyl sulfate from the crude reaction mixture at appropriate temperatures, usually under vacuum. The residue will comprise extremely high yields of the desired sulfonate ester.

Any organic sulfonic acid (of natural or synthetic origin) may be used according to the present invention. Examples of sulfonic acids which may frequently be used in the inventive process include naphthalene sulfonic acids, benzene sulfonic acid, octa decylsulfonic acid, alkyl benzene sulfonic acids, para toluene sulfonic acid, etc. The inventive processes are particularly applicable to, and advantageous with, aromatic sulfonic acids wherein the sulfonic acid group is attached to a benzenoid carbon atom. Such preferred materials may contain more than one benzene nucleus. The starting materials (i.e. organic sulfonic acids) are not limited to the simple sulfonic acids mentioned above, but may also (and frequently will) include substituted derivatives such as chlorinated and nitrated derivatives, as well as various alkylated homologues and analogues. The inventive process is widely applicable to sulfonic acids in general and the particular choice of starting materials is well within the skill of the routineer and will be dictated by the desired product.

METAL SULFONATES

Where metal salt of sulfonic acids (e.g., aromatic sulfonates) are commercially available, they may be used as the starting material, since the method of their preparation is not known to have any significant effect upon the inventive process. The alkali metal and alkaline earth metal sulfonates are preferred. Especially preferred are calcium and barium sulfonates. Where sulfonic acids (e.g., aromatic sulfonic acids), per se, are employed, the metal salt thereof may be obtained by reacting the acid in a neutralizing zone with a basically reacting metal compound such as a finely powdered metal salt of an organic carboxylic acid, e.g., calcium acetate or sodium propionate. Alternatively, and more frequently, basic oxides, hydroxides or carbonates may be employed. As a common expedient, it may be found convenient to employ alkali or alkaline earth metal base as just described (e.g., CaO, $Ba(OH)_2$, NaOH, etc.). Frequently, it will be desirable and convenient to employ these salt forminug materials in the form of aqueous solutions (e.g., 40 wt. percent sodium hydroxide solution). Wide ranges of temperature and pressure may be employed without affecting the utility of the ultimate product in the inventive process. Because of the insensity of the inventive process to the particular technique employed in preparing these metal salts, any known technique may be used. After the metal salt of the sulfonic acid has been prepared, the crude reaction product is treated in any suitable way as by distillation, absorption, etc. to recover the desired metal sulfonates. Numerous suitable techniques for preparation and recovery of these salts are well known to those skilled in the art. Consequently, their preparation, while necesary, does not alone constitute an inventive feature of the present invention. If desired, any unreacted constitutents separated at this point may be recycled for further processing. Alternatively, and much less preferably, the crude reaction product obtained in the formation of the metal sulfonate may be employed directly in the inventive esterification reaction which follows.

For obvious reasons, such a procedure is not preferred, e.g., unnecessary increase in size of the subsequent reaction zone, possible product contamination, etc.

ALKYL SULFATES

The alkyl sulfates used according to the present invention may also be prepared by any known technique since the inventive process described herein is not significantly dependent upon the particular method of manufacture of these alkyl sulfates. Where alkyl sulfates (e.g., dimethyl sulfate) are commercially available, they may be directly employed according to the present process. Where, however, it is necessary to prepare these alkyl sulfates, such preparation may be accomplished by reacting, for example, two moles of the corresponding alcohol with one mole of sulfuric acid. Preferably the dialkyl sulfate is then separated from the other components of the crude reaction product so that it (i.e., the dialkyl sulfate) may be used in a concentrated form in the subsequent inventive esterification reaction. The preparation of dialkyl sulfates, while necessary, does not, alone, constitute an inventive feature of the present invention. Their preparation is well within the skill of the routineer.

Since the present invention is concerned with a process for making sulfonic acid esters, the alkyl sulfate chain lengths, etc. are not particularly critical and the inventive process will find wide applications with an endless variety of alcohols and their corresponding sulfates. Ordinarily, alcohols such as methyl alcohol, ethyl alcohol, propyl alcohols, butyl alcohols, decyl alcohols, etc. will be used. Mixtures of alcohols may also be used. Most often $C_1$ to $C_8$ alcohols will be used, e.g., $C_1$ to $C_6$ alcohols.

DILUENTS

Suitable diluents for use according to the present invention include any water immiscible organic solvent in which the desired sulfonic acid esters are soluble. Suitable solvents include the aromatic solvents such as ortho-dichlorobenzene, benzene, monochlorobenzene, other isomeric dichlorobenzenes, xylene, toluene, etc. Xylene is a particularly useful solvent, especially where dimethylsulfate is employed. The purpose of the diluent is to facilitate reaction between the dialkyl sulfate and the metal salt of the sulfonic acid. While the diluent may be omitted in certain instances, the preferred technique, as contemplated herein, employs such a diluent. Better reaction rates and control are obtained when a judicial amount of diluent is employed. Also, some reactions will not progress properly without a diluent.

BASES

As previously indicated, it is preferred to conduct the desired reaction between the dialkyl sulfates and the metal salt of the sulfonic acid in the presence of a base such as sodium bicarbonate. The function of the base (e.g., sodium bicarbonate) is to keep the reaction mixture alkaline (i.e., pH greater than 7) since alkyl sulfates hydrolyze under acid conditions. Also, it aids in neutralizing any hydrogen sulfate not effectively neutralized by the cation of the metal sulfonate during the course of the reaction. Other basically reacting materials may be used in lieu of sodium bicarbonate and include, but are not limited to $Na_2CO_3$, $KHCO_3$, $K_2CO_3$, CaO, etc. Sodium bicarbonate is the preferred material. These materials can be generically described as metal carbonates, bicarbonates, oxides or hydroxides. The preferred metal components are alkali metals and alkaline earth metals. Mixtures of these materials may be used.

PROCESS DESCRIPTION

According to the present invention, then, metal sulfonate (or a mixture of metal sulfonates) is admixed with a diluent. The amount of diluent employed is not critical and may vary over wide ranges. It is preferred, however, that the amount of diluent employed be kept to a minimum so as to obviate the need for unnecessary oversized reaction zones, etc. The amount of diluent employed should be sufficient to maintain a substantially homogenous reaction mixture and to keep the sulfonic acid ester produced by the inventive process in solution. Generally, the amount of diluent employed will be from about 100 to 10,000 parts (e.g., 1,000 to 8,000 parts) by weight based on 100 parts by weight of the metal sulfonate employed. In some instances, more or less diluent may be employed. This mixture will then be heated in the presence of sodium bicarbonate or other base (often about 30–90 parts by weight) and in the further presence of alkyl sulfate or mixtures thereof (often 50–150 parts by weight). Preferably, a molar excess of dialkyl sulfate should be used (based on one mole of sulfonic acid). Two to ten moles of dialkyl sulfate per mole of sulfonate (calculated as sodium sulfonate) have frequently been employed with continuing excess. As previously indicated the amount of base, e.g., $NaHCO_3$, should be sufficient to neutralize alkyl hydrogen sulfate released during the reaction. Preferably the reaction is conducted under reflux conditions although this feature is not critical. Agitation of the reaction mixture is desirable. Normally, the reaction temperature will range from 100° to 200° C., e.g., from 130° to 150° C. The reaction temperature may be varied somewhat from these values by adjusting the pressure or by changing diluents. Pressures employed may range from sub-atmospheric to super-atmospheric, although atmospheric or substantially atmospheric pressures are usually employed. Pressure is not critical. If desired, the reaction may be conducted under an inert atmosphere and the product thus produced may be stored under such an inert atmosphere to avoid unwanted deterioration prior to use. Reaction times will generally range from 0.5 to 10 hours, e.g., 1 to 6 hours.

EXAMPLES

The present invention will be more clearly understood by reference to the following specific examples which include a preferred embodiment. Unless otherwise indicated all parts are by weight.

Example 1

100 parts (5 grams) of a commercially available calcium mahogany sulfonate having a molecular weight of about 950 (97 wt. percent active ingredient and 3% inert materials), 100 parts (5 grams) of dimethyl sulfate, 60 parts (3 grams) of $NaHCO_3$ and 4,000 parts (200 grams) of commercial solvent-grade xylene were charged to a 500 ml. round-bottomed flask equipped with a reflux condenser and a Teflon bar magnetic stirrer. The reflux condenser was vented to the atmosphere through a desicating tube packed with a disicant. The reaction mixture was refluxed for about 3 hours with stirring. The reflux temperature was 138–144° C. At the end of the 3 hours the reaction mixture was allowed to cool and then filtered to remove unwanted solids. The filtrate was next heated to evaporate the solvent (xylene). The product remained behind and was a clear, amber, viscous liquid which was neutral to titration with a base and had no ash content on ignition. The product yield was 94% of theoretical, based on the amount of metal sulfonate used.

Example 2

The procedure of Example 1 was repeated (with similar results) by using a commercial calcium sulfonate produced from heavy detergent alkylate (produced by alkylating benzene with tetrapropylene) as the metal salt of sulfonic acid.

Example 3

The procedure of Example 1 was repeated using a commercial barium petroleum sulfonate having a molecular weight of about 1050 (87 wt. percent active ingredient, 13% inert materials) as the metal salt of sulfonic acid. The yield was 90% of theoretical.

From these examples, it can be seen that the inventive process is convenient and results in excellent yields of the desired sulfonic acid esters.

The procedure of Example 1 has been successfully repeated numerous times (with yields of from 90% to essentially quantitative) using metal salt of a variety of sulfonic acids. The inventive process is particularly advantageous when applied to aromatic sulfonic acids wherein the sulfonic acid group is attached to a benzenoid carbon atom. Molecular weights of from 158–700, e.g., 400–600, for such aromatic acids are particularly well suited to this process.

Attempts to substantially repeat Example 1 without using a diluent, but still at the same temperatures, did not result in desired amounts of the ester product. It appeared that the excess dimethyl sulfate present in the reaction mixture destroyed much of the desired product as rapidly as it formed. However, the same reaction functions well in the presence of other organic solvents. At the present time, then, it is considered that a solvent or diluent is required when dimethyl sulfate is employed. The various three-star headings used throughout the description are not intended to be limiting, but are provided only as a convenience to the reader.

Having described the present invention with a certain degree of particularity, it will be realized that numerous modifications and adaptations of the present invention will be obvious to those skilled in the art, which modifications and adaptations will fall within the spirit and scope of the invention as hereinafter claimed.

What is claimed is:

1. A process for preparing aryl sulfonic acid esters which comprises:
   (a) forming a reaction mixture of 100 parts by weight of metal sulfonate selected from the group consisting of alkali and alkaline earth metal aryl sulfonates, 100 to 10,000 parts by weight of water immiscible organic solvent, 30 to 90 parts by weight of base and 50 to 150 parts by weight of dialkylsulfate having 1 to 6 carbon atoms in a reaction zone,
   (b) heating said reaction mixture to a reaction temperature of from 100° to 200° C. for from 0.5 to 10 hours to form a crude reaction product comprising substantial amounts of desired sulfonic acid ester, and
   (c) recovering said desired sulfonic acid ester from said crude reaction product, said metal sulfonate being formed from a basic component containing metal selected from the group consisting of alkali metals, alkaline earth metals, and mixtures thereof, and from sulfonic acid having a molecular weight of from 158–700 wherein the sulfonic acid group is attached to a benzenoid carbon atom.

2. A process as defined in claim 1 wherein said metal sulfonate is alkaline earth metal sulfonate prepared from sulfonic acid having a molecular weight of from 400 to 600.

3. A process as defined in claim 2 wherein said dialkyl sulfate is dimethyl sulfate.

4. A process as defined in claim 3 wherein the reaction temperature approximates the reflux temperature of the solvent and is from 130° to 150° C.

5. A process as defined in claim 4 wherein the solvent is xylene and from 1,000 to 8,000 parts by weight of solvent are used.

6. A process as defined in claim 5 wherein the metal sulfonate comprises calcium sulfonate.

7. A process as defined in claim 5 wherein the metal sulfonate comprises barium sulfonate.

8. A process for preparing aryl sulfonic acid esters which comprises:
   (a) forming an alkaline reaction mixture of metal aryl sulfonate, organic solvent and dialkylsulfate having 1 to 8 carbon atoms in a reaction zone, said metal being selected from the group consisting of alkali metals, alkaline earth metals, and mixtures thereof, and the amount of dialkyl sulfate present being a molar excess based on said metal sulfonate (calculated as moles of sodium sulfonate),
   (b) heating said reaction mixture to a reaction temperature of from 100° to 200° C. for from 0.5 to 10 hours to form a crude reaction product comprising substantial amounts of desired sulfonic acid ester, and
   (c) recovering said desired sulfonic acid esters from said crude reaction product.

9. A process as defined in claim 8 wherein from 100 to 10,000 parts by weight of solvent are used per 100 parts by weight of metal sulfonate.

10. A process as defined in claim 9 wherein the mole ratio of dialkyl sulfate to metal sulfonate (calculated as moles of sodium sulfonate) is from 2:1 to 10:1.

11. A process for preparing aryl sulfonic acid ester which comprises reacting a metal sulfonate selected from the group consisting of alkali and alkaline earth metal aryl sulfonates with dialkylsulfate having 1 to 8 carbon atoms under alkaline conditions in the presence of a solvent at a reaction temperature of from 100° to 200° C. for a time sufficient to form substantial amounts of said sulfonic acid ester and thereafter recovering said ester.

References Cited by the Examiner

Mizuch et al.: C.A., vol. 42, p. 1260f (1948).

Houben-Weyl: "Methoden Der Organischen Chemie," vol., 9, p. 669 (1955).

CHARLES B. PARKER, *Primary Examiner.*

F. D. HIGEL, *Assistant Examiner.*